United States Patent [19]

Trumbull et al.

[11] Patent Number: 4,629,298

[45] Date of Patent: Dec. 16, 1986

[54] FLUX PROJECTOR FOR USE WITH COMPOSITE PHOTOGRAPHY

[75] Inventors: Donald Trumbull, Woodland Hills; Jonathan Erland; Stephen Fog, both of Los Angeles; Paul Burke, Glendora, all of Calif.

[73] Assignee: Apogee, Inc., Van Nuys, Calif.

[21] Appl. No.: 830,446

[22] Filed: Feb. 18, 1986

Related U.S. Application Data

[63] Continuation of Ser. No. 637,613, Aug. 3, 1984, abandoned.

[51] Int. Cl.$^4$ .............................................. G03B 21/26
[52] U.S. Cl. ....................................... 353/30; 353/28; 353/84
[58] Field of Search ...................... 353/30, 31, 37, 84, 353/121, 122, 28, 38; 352/89, 47

[56] References Cited

U.S. PATENT DOCUMENTS

| | | | |
|---|---|---|---|
| 2,336,508 | 12/1943 | Smith et al. | 353/121 X |
| 3,350,980 | 11/1967 | Margolin | 352/89 X |
| 4,018,519 | 4/1977 | Clapp | 352/89 |
| 4,488,207 | 12/1984 | Harmon | 362/268 X |
| 4,497,013 | 1/1985 | Ohta | 362/32 |
| 4,497,015 | 1/1985 | Konno et al. | 362/268 |

FOREIGN PATENT DOCUMENTS

1025191  10/1962  United Kingdom .................. 352/47

*Primary Examiner*—Harry N. Haroian
*Attorney, Agent, or Firm*—Jeffrey J. Blatt; Blakely Sokoloff

[57] ABSTRACT

The present invention provides a projector having particular application for use in front projection composite photographic systems. In particular, the present invention relates to composite color photography, whether still, motion picture, or video in which foreground and background scenes are separately recorded and subsequently combined, using known "blue screen" or special background color techniques, to form a single image. The present invention includes a high pressure, short arc, mercury-xenon lamp in an optical system to produce a high intensity beam at wavelengths of either: 436 n.m. (blue); 545 n.m. (green); 589 n.m. (yellow) or 650+ n.m. (red). The selected color beam is then manipulated by optical elements into close correspondence to the viewing angle of a camera lens, and made coincident with the camera view by means of a beam splitter. Unwanted light is removed from the system through a "light trap" which traps and systematically absorbs incident light. The projected beam proceeds along the axis of the camera view to a retro-reflective projection screen, and returns therefrom along the same axis to the camera lens. Foreground subject matter interposed between the camera and the retro-reflective screen will therefore be combined with the image on the screen of the predetermined color, for subsequent compositing by methods known to the art.

11 Claims, 9 Drawing Figures

FLUX PROJECTOR FOR USE WITH COMPOSITE PHOTOGRAPHY

This is a continuation of application Ser. No. 637,613 filed Aug. 3, 1984 now abandoned.

BACKGROUND OF THE INVENTION

1. Field of the Invention

The present invention relates to composite photography, and more particularly, to projectors used to project light of a desired wavelength in motion picture travelling matte photography.

2. Art Background

In motion picture production, it is sometimes impractical or impossible to place actors in the specific environments to be depicted. To resolve this problem, various techniques have evolved over the years to composite such scenes from separately filmed "elememts." Initially, in early films such as Georges Melies' "Trip to the Moon" (1902), animation was resorted to. Thereafter, techniques were utilized such as the "held/take" process, in which a scene was shot with predetermined areas of the successive frames blocked out in order to preclude exposure thereof. The unexposed portions of the successive frames were thereafter exposed to the desired foreground subjects, with the background areas blocked off with an opaque matte to protect the previously recorded latent images thereon. Essentially the same process is used to incorporate a painting which depicts a distant, dangerous, or totally alien scene against which the actors are to appear; this is known as matte painting.

In order to depict actors or other foreground subjects moving in front of the desired background scenes. various techniques were developed over the years. One early approach involved the so-called "carousel" in which motion effects were simulated, for example, by photographing actors on dummy horses or in automobiles in front of a cylindrical, painted backdrop revolving through the frame behind the actors. This technique evolved into rear projection/front projection filming operations in which a separately filmed background scene was projected onto a screen behind the foreground subject, and re-photographed simultaneously therewith to produce a composite image. (See: Fielding, *The Art of Special Effects*, pp. 306–323; Alekan-Gerard Process for Composite Photography. U.K. Pat. No. 768.394; Jenkins, U.S. Pat. Nos. 2,727,427 and 2,727,429; Philip Palmquist, *American Cinematographer*, 7/69; Petro Vlahos, *Association of Motion Picture and Television Producers Research Center Report No. R-053* and also *Journal of the Society of Motion Picture and Television Engineers*, Vol. 80, Sept. 1971; Perisic, U.S. Pat. No. 4,100,572; and Samuelson, *American Cinematographer*, Oct. 1981.

However, the use of such operations necessitates synchronizing the rear or front projection system and the camera, as well as accurate balancing of both the illumination across the projected image of the background scene and the illumination and color balance of the foreground subject, relative to the background scene. Such techniques are inherently expensive, requiring the prior filming and independent processing of the background scene, and the additional expensive studio time for filming the foreground subject in conjunction with the background plate. There is usually a discernable loss of image quality in the rephotographed projected image (Vlahos/Holm, *Association of Motion Picture and Television Producers*, Research Center Bulletin No. B-O 30/01) when compared to the original photography of the foreground action.

To retain both image quality and the flexibility inherent in optical compositing, while insuring the freedom of movement basic to the front projection technique, it became necessary to create mattes which would change from frame to frame, or "travel". Such "travelling mattes" were initially produced manually or mechanically. However, in order to meet the ever-increasing demand for fidelity, a wide variety of photographic techniques for producing travelling mattes have subsequently been developed. These generally utilize either the so-called "single-film" or "multi-film" approaches.

Several single-film and multi-film systems of travelling matte cinematography have been described in the patent literature. See, for example, U.S. Pat. Nos. 1,673,019; 1,697,315; 1,840,669; 1,840,670; 1,860,737; 1,863,827; 1,955,993; 2,013,886; 2,028,863; 2,232,144; 2,277,141; 2,297,598; 2,461,127; 2,651,233; 2,693,126; 2,740,712; 3,095,304; 3,149,969; 3,158,477; 3,260,563; 3,902,798 as well as U.S. Pat. No. 4,417,791. The preceeding and like travelling-matte systems have also been reviewed in the technical literature. See, for example, "Travelling-Matte Photography and the Blue Screen System," Beyer, *Journal of the Society of Motion Picture and Television Engineers*, Mar. 1965, Vol. 74, No. 3, pp. 217–236; "The Technique of Special Effects Cinematography," Fielding, 1968, pp. 218–253; and "Talking Technically," David Samuelson, *American Cinematographer*, May, 1982, page 434, and June 1982, page 588.

Early single-film matte processes relied upon contrast alone, the foreground action being filmed against a jet black backing and the resulting image being printed through several generations of high contrast film stock until a matte was produced. The results obtained by this technique were generally quite poor, due to the inevitable distortion produced by the multiple reversals.

Subsequently, with the advent of subtractive color film, a single film technique was developed which relied upon the dedication of one of the three emulsion layers of the color negative film to the matte. While all three emulsion layers have been utilized from time to time for matte formation, the blue layer has always been preferred. This is due in part to the relative granularity of the three emulsion layers as well as to the conviction that since flesh tones (which contain very little blue) are normally a part of the foreground subject, the blue record is the more readily sacrificed. In fact, in the hands of a very skillful optical compositor, any of the three records can produce an adequate matte. Nevertheless, the dominant travelling matte process in the industry today is the "blue screen" process.

While there are numerous variations of the blue screen process, each generally involves exposure of a color negative film to a foreground subject in front of a blue backing. The backing may, for example, be a front lit painted backing, a retro-reflective screen which is front lit by reflection from a blue flux projector, or a rear lit translucent blue transmission screen. The color negative image thus formed is utilized, dependent upon the particular technique employed, to produce sets of black and white separation positives and matte images. The mattes are thereafter used to facilitate compositing of the foreground subject with the image of a separate background scene.

Various multi-film systems have also been developed for the formation of travelling mattes. Such typically require the huge, complex "Technicolor "camera, and employ the simultaneous exposure through a beam splitter of a color negative film and a further film sensitive to some narrow portion of the spectrum. The matte image is thereby formed on the latter film, thus eliminating the necessity to produce separation positives, and obviating the loss of any portion of the spectrum for matte formation. Such techniques (See, for example, U.S. Pat. No. 3,095,304) may be utilized in the formation of travelling mattes of objects which move or which have fine details (e.g., hair) without fringing.

However, a major problem with any travelling matte system which utilizes an illuminated screen behind a foreground subject to produce a matte is that the radiation transmitted from the screen, whether it be infrared, ultraviolet or within the visible spectrum, is reflected from any glossy or specular metallic surface on the foreground subject matter causing holes or ragged edges in the mattes. Furthermore, the color negative film currently used for the process, Eastman Kodak No. 5247, requires extremely pure blue light exposure, thus making it very difficult to use blue paint as a backing. This leaves the standard Stewart Transmission blue screen as the backing of choice. But this blue screen backing is limited to a maximum size of 90 feet by 40 feet. An alternative is to use a front projection apparatus and a high gain retro-reflective screen, for which there is no size limit, and project a pure blue light. This technique was probably first done by Abbott on the motion picture *Tora!Tora!Tora!*. Abbott also noted a serendipitous benefit of great importance obtained by this method of carrying out the blue screen process: blue spill, the bane of blue screen compositing, is largely eliminated by virtue of the fact that the projected blue light is of necessity a coherent beam, and this is further enhanced by the retro-reflective screen's faculty for returning the beam strictly along its own axis. Therefore, there is essentially no scattered blue light remaining to fall upon foreground subject matter from whence it would be reflected back to the camera, with the consequent degradation of the matte image.

The circumstance accompanying Abbott's discovery typifies the problem: his foreground subject consisted of a glistening wet submarine. Had he been required to position the submarine in front of a conventional transmission blue screen, the diffuse and incoherent blue light would have bounced off the wet submarine surface and caused holes in his matte image. A problem that confronted Abbott and subsequent practitioners of this technique is that the white light source-lamps commonly used for front projection of full color plates are relatively deficient in the blue region of the spectrum, requiring the use of very large wattages and commensurately large lamphouses, with the resulting severe inhibition of camera flexibility.

As will be described, the present invention provides a projector having application for use in front projection systems. Although the present invention is particularly suited for use in blue screen travelling matte processes, it has utility in numerous other special effects applications.

SUMMARY OF THE INVENTION

The present invention provides a projector having particular application for use in front projection composite photographic systems. In particular, the present invention relates to composite color photography, whether still, motion picture, or video, in which foreground and background scenes are separately recorded and subsequently, or simultaneously, combined, using known "blue screen" or special background color techniques, to form a single image. The present invention includes a high pressure, short arc, mercury-xenon lamp in an optical system, to produce a high intensity beam at wavelengths of either: 436 n.m. (blue); 545 n.m. (green); 589 n.m. (yellow) or 650+n.m. (red). The selected color beam is then manipulated by optical elements into close correspondence to the viewing angle of a camera lens, and made coincident with the camera view by means of a partially silvered mirror or dichroic beam splitter. Unwanted light is removed from the system through a "light trap" which traps and systematically absorbs incident light. The projected beam proceeds along the axis of the camera view to a retro-reflective projection screen, and returns therefrom along the same axis to the camera lens. Foreground subject matter interposed between the camera and the retro-reflective screen will therefore be combined with the image on the screen of the predetermined color, for subsequent compositing by methods well known to the art.

DETAILED DESCRIPTION OF THE DRAWINGS

DETAILED DESCRIPTION OF THE INVENTION

A projector having particular application for use in front projection composite photographic systems is disclosed. In the following description for purposes of explanation, specific materials, shapes, optical configurations, structures, and values are set forth in order to provide a thorough understanding of the present invention. However, it will be apparent to one skilled in the art that the present invention may be practiced without these specific details. In other instances, well known optical elements and systems are shown in diagramatical form in order not to obscure the present invention unnecessarily.

Figure 1:
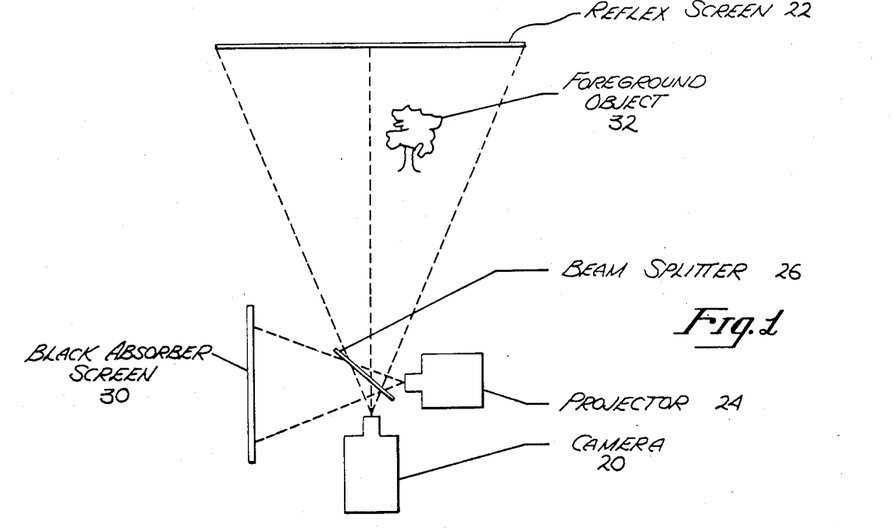
FIG. 1 is a diagramatical illustration of a typical front projection composite photographic system.

Referring now to FIG. 1, a traditional front projection system is illustrated. A camera 20 is disposed in optical alignment with a reflex screen 22. A projector 24 is positioned substantially 90° relative to camera 20. A partially silvered mirror ("beam splitter") 26 is disposed in optical alignment with, and at a 45° angle relative to, camera 20 and projector 24, such that images projected by projector 24 are reflected onto reflex screen 22 and may be photographically recorded by camera 20. In practice, beam splitter 26 is partially silvered such that a desired percentage of the light from projector 24 is reflected onto the reflex screen 22. Light which is not reflected by beam splitter 26 is passed onto a black absorber screen 30 (commonly referred to as a "light trap"), so as not to interfere with the images recorded by camera 20. As illustrated, foreground object 32 is disposed between camera 20 and reflex screen 22. The resulting image, as viewed by camera 20, is a composite of the projected image onto reflex screen 22 in conjunction with the image of the foreground object 32.

As shown, light reflected from reflex screen 22 and foreground object 32 is passed through beam splitter 26 such that the reflected light is recorded by camera 20. A composite scene is thereby generated, in which the viewer observes the projected image from projector 24 and the foreground object 32 as being coincident in time and space. An optical set-up similar to that disclosed in FIG. 1 may be used such that projector 24 projects blue light to generate travelling mattes for use in special effects photography. A description of one travelling matte technique utilizing a "reverse" blue screen process is described in U.S. Pat. No. 4,417,791, issued Nov. 29, 1983. As will be described below, the present invention discloses a projector which may be utilized to project light of a specific wavelength for use in front projection composite photographic systems. It will be appreciated that although the present invention is described in conjunction with motion picture photography, that the present invention may be utilized in other photographic systems, including electronic video recording.

Figure 3:
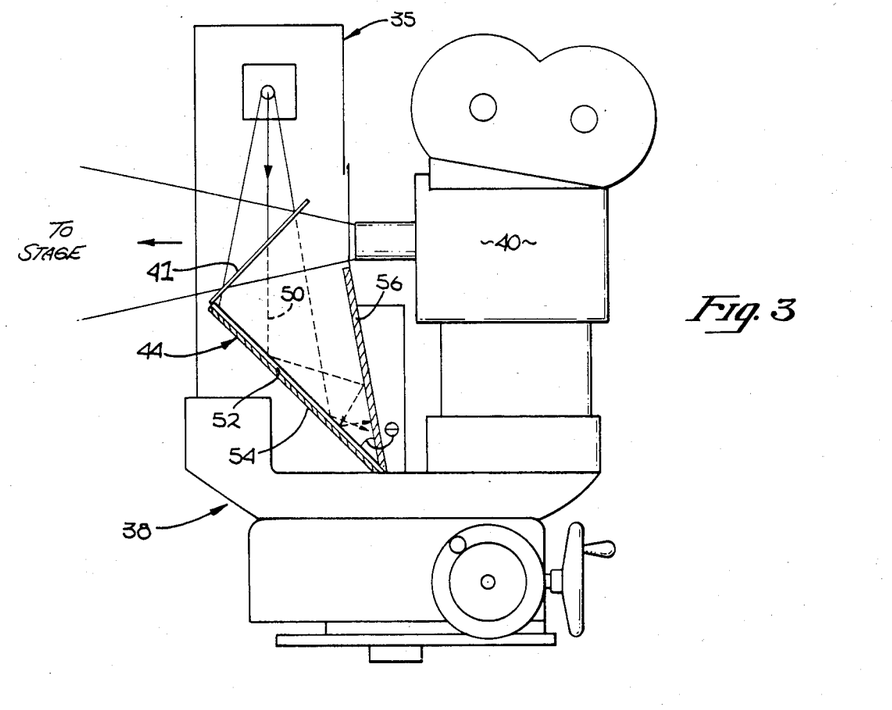
FIG. 3 is a partial sectional front view of the present invention illustrating the present invention's light trap and beam splitter.
Figure 9:
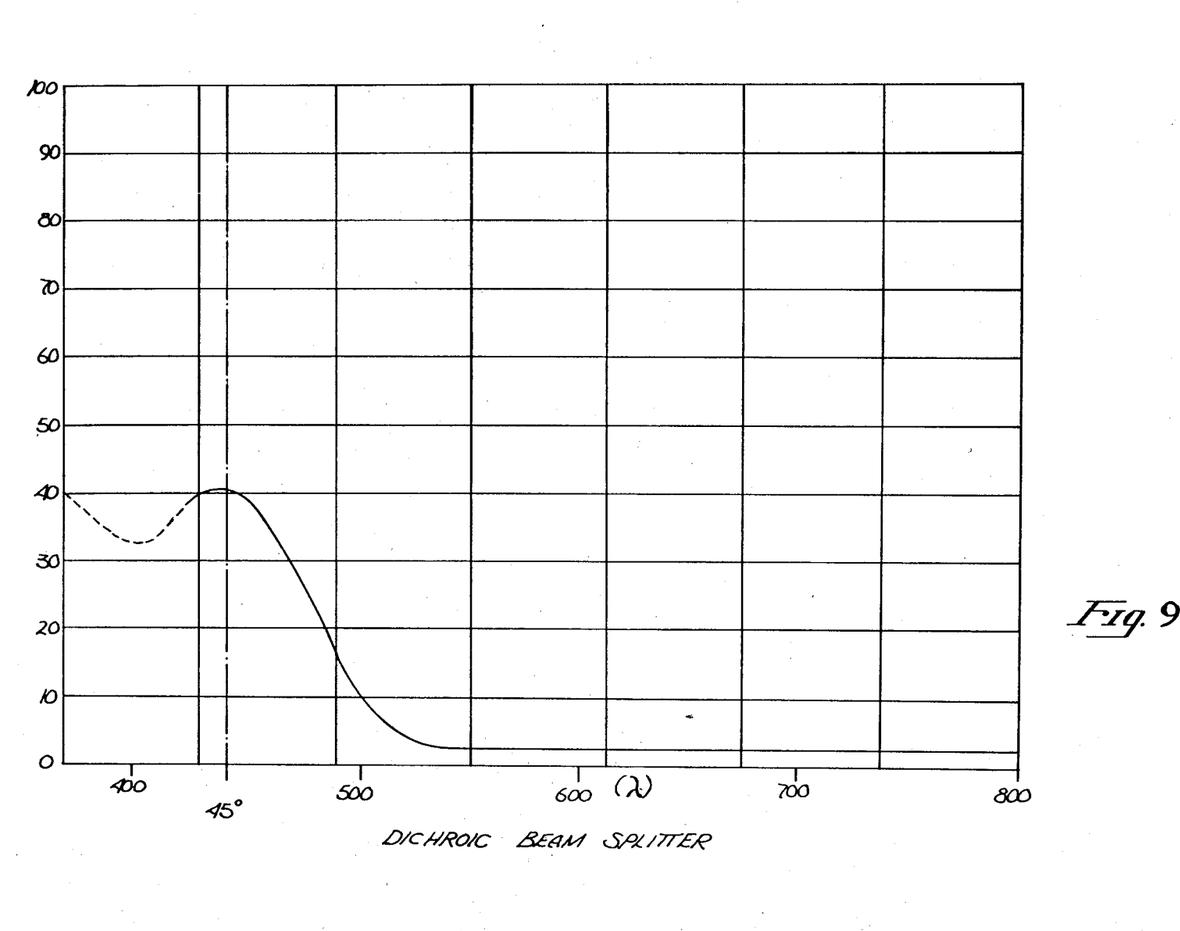
FIG. 9 is a graph illustrating percent transmission versus wavelength of the present invention's dichroic beam splitter.

Referring briefly to FIG. 3, a flux projector comprising the present invention is identified by the numeral 35. As illustrated, projector 35 is typically disposed on a support structure 38 along with a camera 40, such that both the projector 35 and camera 40 may be appropriately tilted, panned and physically moved to various locations. Accordingly, unlike the optical set-up disclosed in FIG. 1, the present invention permits quick movement of the projector and camera to a different location without the necessity of repositioning the optical elements. As shown in FIG. 3, projector 35 and camera 40 are disposed at a substantially 90° angle with respect to one another such that light is projected from projector 35 onto a beam splitter 41 which reflects a preselected portion of the light generated by projector 35 toward reflex screen 22. A preselected percentage of light reflected from reflex screen 22 and foreground object 32 is passed through beam splitter 41 on its return and recorded by camera 40. Beamsplitter 41 may be of a classic design wherein surfaces of the beamsplitter are partially silvered. Alternatively, the surfaces of beam splitter 41 may be coated with a dichroic coating such that only preselected wavelengths are reflected onto reflex screen 22 with the remaining wavelengths passed through the beam splitter 41. One example of a dichroic coating combination utilized by one embodiment of the present invention is disclosed in FIG. 9. As illustrated, the beam splitter face is disposed at a 45 degree angle relative to the incident light, and the dichroic coating is chosen such that blue light is reflected and other wavelengths passed.

Also illustrated in FIG. 3 is the present invention's "light trap" 44 which effectively absorbs unwanted light passing through the beam splitter 41 so as not to interfere with the photographic recording of camera 40. Unwanted light 50 (that percentage of light not reflected by beam splitter 41) is directed onto a "smoked" (e.g. tinted) glass plate 52. Light which is not absorbed by the smoked glass plate 52 and passes through the plate falls on a black absorbing material (e.g. black velvet) 54 which is disposed behind the smoked glass plate 52. Any light reflected off of the smoked glass plate 52 is reflected such that it impinges another absorbing material 56 disposed on opposite wall of the present invention's light trap. Any light which is not absorbed but reflected from the absorbing material 56 will be reflected back onto the smoked glass plate 52, as illustrated. The angle between the smoked glass plate 52 and the opposite wall of the light trap and black absorbing material 56 is chosen such that light reflected off of either surface is directed into the light trap and against the opposite wall. Accordingly, unwanted light entering the light trap 44 is sequentially and systematically absorbed as it is reflected into the depths of the trap.

Figure 6:
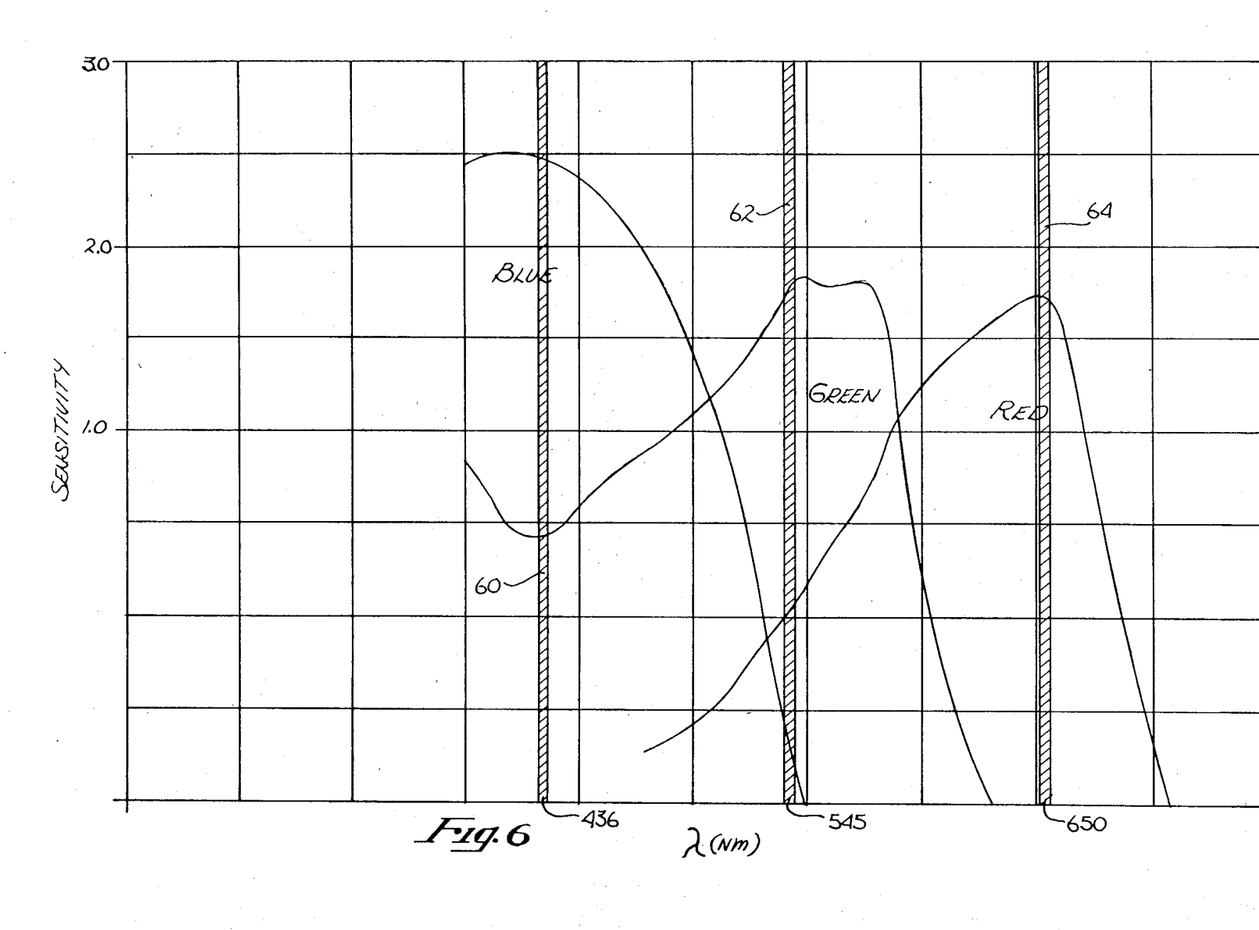
FIG. 6 is graph illustrating sensitivity versus wavelength for Eastman Kodak 5247 film.

Referring briefly to FIG. 6, the spectral response curve for Eastman Kodak 5247 film is illustrated. This particular film is currently preferred by the motion picture industry, especially for use in motion pictures involving composite photography. As illustrated, Kodak film 5247 has a sensitivity curve which denotes three distinct sensitivity peaks for blue, green and red. The clearest separation for the blue exposure occurs in wavelengths between 430 and 440 nanometers ("n.m."). As shown, the 436 n.m. wavelength comprises the blue exposure optimum wavelength, and is identified by line 60 in FIG. 6 since the overlapping green sensitivity curve reaches its perigee (lowest point) while the blue sensitivity has reached, or is approaching its apogee. Similarly, the clearest separation between the green sensitive layer and the adjacent blue and red sensitive film layers occurs very close to 545 n.m., identified as line 62 in FIG. 6. Finally, the optimum red sensitivity wavelength for the Kodak 5247 film occurs at approximately 650 n.m., and is identified by line 64 in FIG. 6. Accordingly, in front projection composite photography, it is highly desirable to provide a pure form of light centered about one of these peak sensitivity curves in accordance with a particular application. For example, where blue light is required for a blue screen process and Kodak film 5247 is utilized, the light provided by projector 35 should be centered as closely about line 60 in FIG. 6 as possible.

Figure 2:
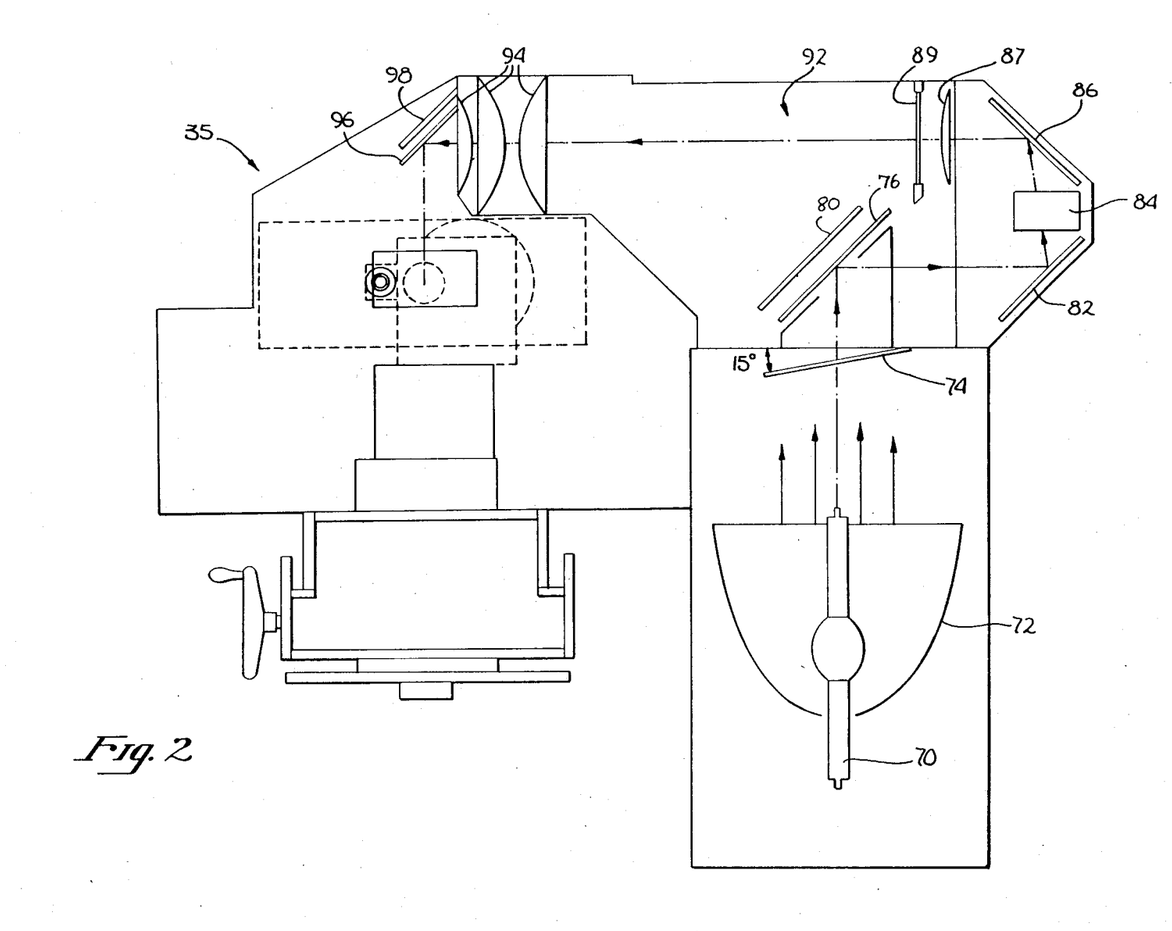
FIG. 2 is a side sectional view of the present invention illustrating its optical elements and projection paths.
Figure 4:
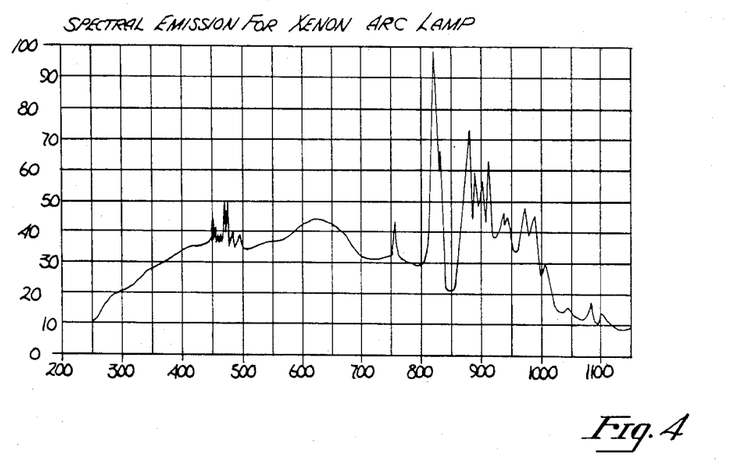
FIG. 4 is a graph illustrating the spectral emission of a xenon arc lamp.

Referring now to FIG. 2, the optical configuration of the projector 35 of the present invention is illustrated. The present invention includes a lamp 70 used to generate light for the projector 35. The particular choice of lamp 70 is important to insure that the light spectrum projected by projector 35 corresponds to the preferred wavelengths illustrated in FIG. 6. Referring briefly to FIG. 4, the spectral emission curve for a xenon-arc lamp is illustrated. From the graph it will be appreciated that the emission of a xenon-arc lamp at 436 (blue) and 545 (green) nanometer wavelengths is relatively small in comparison to discharges in the 800 to 1100 n.m. range. Accordingly, an attempt to isolate the 436 and/or 545 n.m. lines of the xenon-arc lamp would yield considerably less output than that from a mercury lamp, thereby requiring a massive increase in the lamp wattage to yield the same result. On the other hand, it has been found that the mercury lamp alone has little or no emission at 650 n.m. (red). In addition, it is known that a high pressure, short arc pure mercury lamp of wattage in the realm of 5000 watts is impractical if not impossible to construct. Accordingly, neither a xenon or mercury-arc lamp would be preferable for use as lamp 70 of the present invention given the choice of Kodak film 5247.

Figure 5:
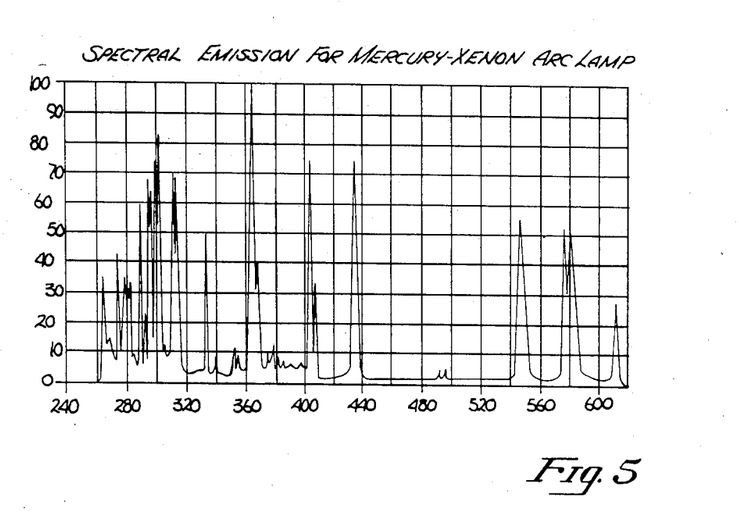
FIG. 5 is a graph illustrating the spectral emission for a mercury-xenon arc lamp.

Referring now briefly to FIG. 5, the spectral emission for a mercury-xenon arc lamp is illustrated. As shown, the combination of a mercury-xenon element lamp produces a spectral emission wherein the mercury component tends to dominate, thus providing the principal emission lines, namely 436 and 545 n.m. while still providing sufficient emission at 650 nanometers due to the xenon component.

Based on the above spectral emission analysis in accordance with the emission needs of the Kodak 5247 film, the present invention in its preferred embodiment utilizes a 5000 watt mercury-xenon lamp 70. Although mercury-xenon arc lamps have been used in various processes, such as silk screen printing etc., mercury-xenon arc lamps have not been, prior to the present invention, used in compsite photography. The particular spectral emission of mercury-xenon permits, as will be described, projector 35 to project pure blue, red, green or yellow light for various compositing processes. Referring once again to FIG. 2, mercury-xenon lamp 70 is surrounded by a reflector 72 which focuses the light toward a dichroic filter 74. As illustrated, filter 74 is disposed at approximate 15° degree angle relative to the path of the light generated by lamp 70, such that light reflected by the filter 74 is not reflected directly back toward the lamp 70, and thereby deflects heat away from the lamp. Although the present invention has utility for applications involving the projection of red, green or yellow light as well as blue light, in the presently preferred embodiment projector 35 is utilized in a blue screen process which requires pure blue light. Accordingly, this Specification is directed toward teaching the projection of blue light using a variety of filters and optical configurations to isolate the 436 n.m. line from the spectral emission curve of FIG. 5. However, it will be appreciated that other pure colors may be generated by the present invention by using appropriate filters in place of those described.

Figure 7:
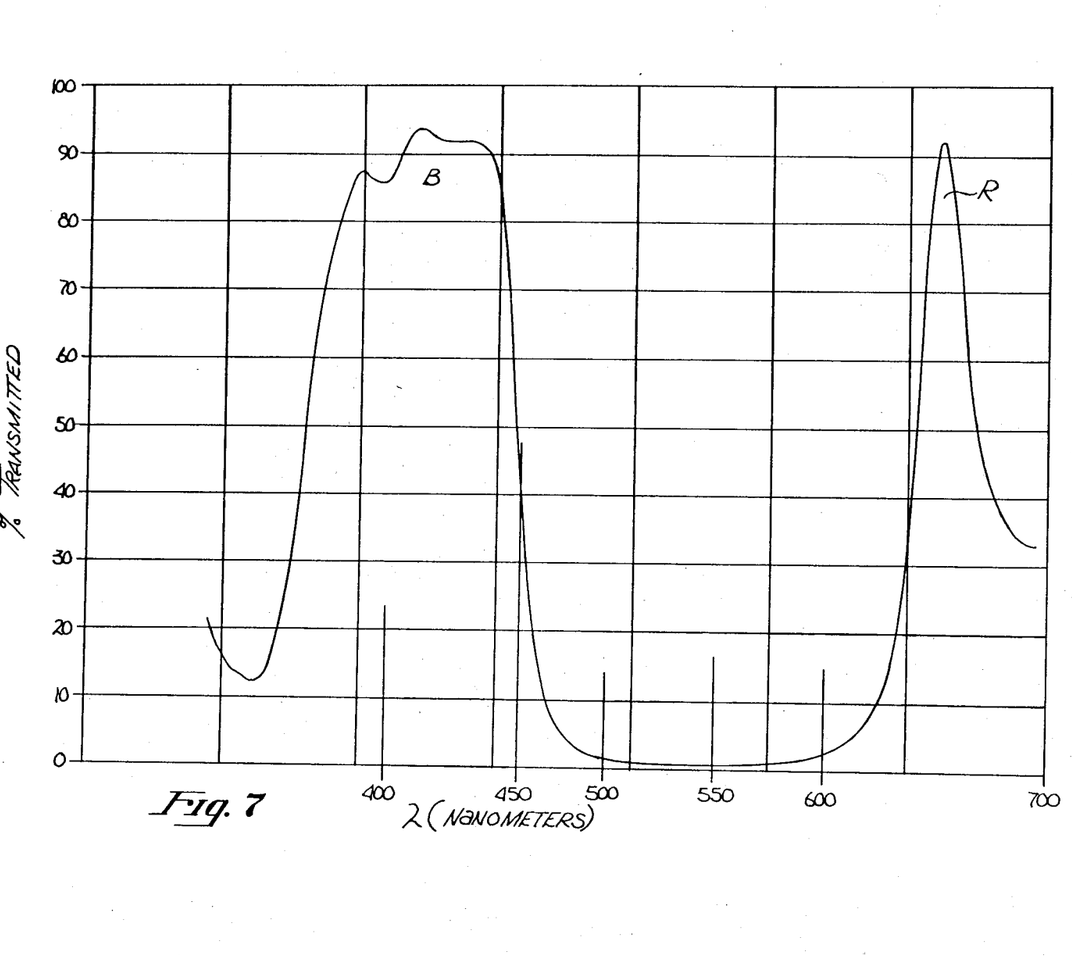
FIG. 7 is a graph illustrating percent transmission versus wavelength for the present invention's 0° filter.

In addition to reflecting heat away from lamp 70, filter 74 removes unwanted spectral emissions of lamp 70 such that in the presently preferred embodiment only a range of wavelengths within the blue end of the spectrum is permitted to pass. This filtered light is directed onto a dichroic reflection filter 76 which is designed to reflect only light having a predetermined range of blue wavelengths (see FIG. 8 for the spectral transmission curve of filter 76). Light which falls outside of the band width of filter 76 is directed onto a light absorbing material 80 (e.g. black steel mesh). Once the light is reflected off of filter 76, it is reflected off of a dichroic reflecting filter 82 also having a spectral transmission curve illustrated in FIG. 8, and is directed onto an optical integrator 84. Optical integrator 84 comprises a cluster of small rods comprising lens elements which homogenizes the incident light reflected off of dichroic filter 82, and matches the irradiance cone angle of reflector 72 to the cone angle of adjacent optical elements. The blue light passed into integrator 84 is integrated and homogenized such that the light passing out of integrator 84 is uniform in intensity across the cross-section of the light beam. Integrator 84 may comprise one of a variety of well known integrator types currently available in the industry. Now homogenized, the light passing through integrator 84 is directed onto another dichroic filter 86 (see FIG. 8 for transmission curve) which further isolates the desired wavelength of light (in the present case blue at 436 n.m.) and reflects this light through a lens 87 and a 0° broad band dichroic filter 89. The transmission characteristics of 0° dichroic filter 89 is illustrated in FIG. 7. As shown, the 0° dichroic filter 89 passes light in two basic regions of the spectrum, namely light having blue and red components. It will be noted that although the light generated by lamp 70 has been filtered significantly by the time it reaches 0° dichroic filter 89, the bandwidth of blue light passed by the filter 89 is still significantly broader than the limited 436 n.m. line sought. In addition, although 0° filter 89 passes red light, in the case where blue light is desired the red component has been filtered out by the other previously described filters.

Figure 8:
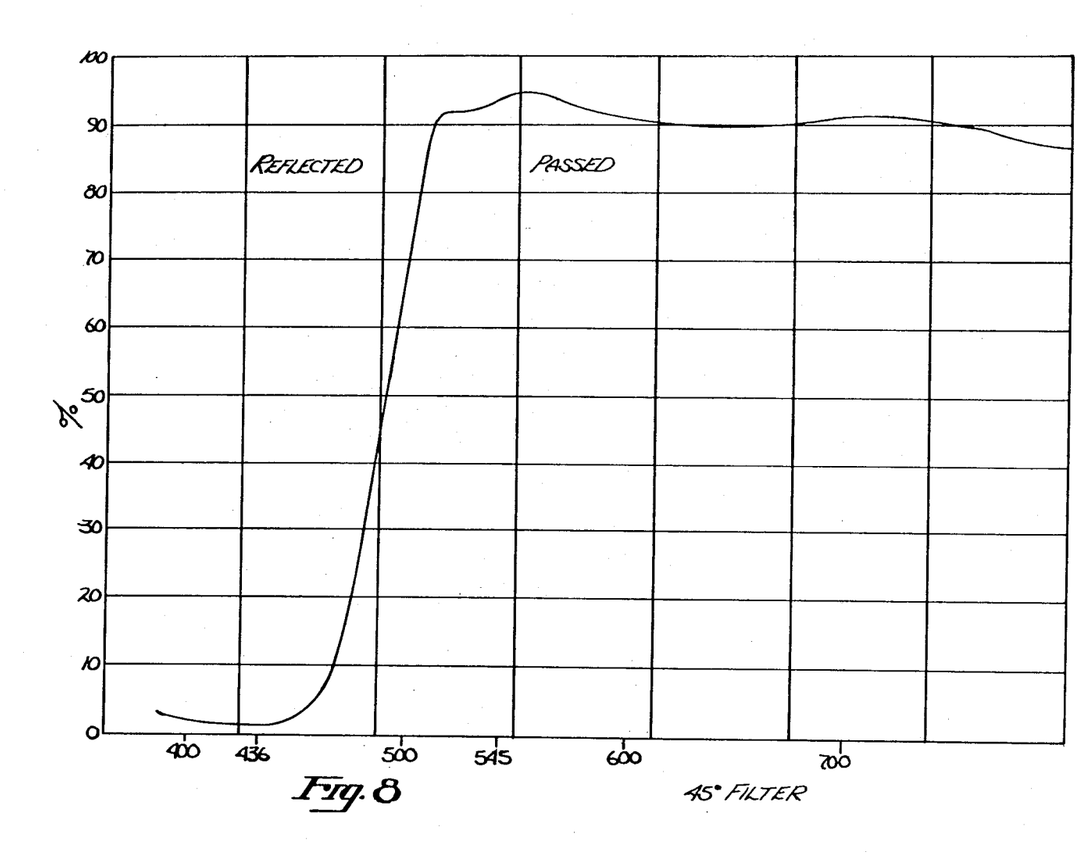
FIG. 8 is a graph illustrating percent transmission versus wavelength of the present invention's 45° filter.

Light passing through the 0° dichroic filter 89 is passed through an open chamber 92 in which various optional devices, such as light attenuators and the like may be disposed if desired. The filtered light is then directed onto condensor lenses 94 which tailor the beam angle and condense the incident light rays. The now condensed light is directed onto a 45° dichroic mirror 96 which is disposed at substantially 45° with respect to the incident light. The reflection versus transmission characteristics of the dichroic filter mirror 96 is illustrated in FIG. 8. As shown, substantially all of the light not within the 436 n.m. range is permitted to pass through the filter 96 onto a black absorbing screen 98. The light which is reflected in accordance with the curve illustrated in FIG. 8 is now extremely pure in color, and is directed out of projector 35 onto the beam splitter 41 as illustrated in FIG. 3. Accordingly, it will be appreciated that the emission of lamp 70 is systematically narrowed and tailored such that only desired wavelengths of the lamp's output are projected by the projector 35. The light projected by the projector 35 is in close correspondence to the viewing angle of the lens of camera 40. The projected beam is rendered coincident with the view of camera 40 by the use of beam splitter 41. The combined projected beam and image cone of the camera then traverses the distance from the camera 40 to the front projection retro-reflective screen 22, where it is reflected and returned back along the same axis to the camera 40 and thereby exposing the color negative film employed.

Thus, a flux projector having particular application for use with composite photography has been disclosed. Through the selective use of filters, specific and narrow bands of light may be isolated from the spectral emission of a mercury-xenon arc lamp for projection. Depending upon the photographic process and emulsion used, narrow bands of blue, red, green and yellow in the case of sodium yellow processes may be isolated and projected. Although the present invention has been described with reference to FIGS. 1 through 9, it will be appreciated that the present invention has utility far exceeding that disclosed in the Figures.

We claim:

1. A high power optical projector for generating and projecting light having narrow and specific spectral bands for use in composite photography comprising:

light generation means including a mercury-xenon discharge arc lamp for generating light having a plurality of narrow emission lines, said light generation means including a reflector surrounding said discharge lamp for focusing said light;

filtering means including a series of dichroic filters disposed in optical alignment with said light generation means for filtering out light falling outside a preselected range of wavelengths;

integrator means disposed in optical alignment with said filtering means for integrating said light and homogenizing said light such that the intensity of said light is substantially uniform across its projected field;

condensing means disposed in optical alignment with said homogenized light for condensing and tailoring the cross section of said beam such that said projected beam diverges at a preselected angle;

said integrator means matching the irradiance cone angle of said discharge lamp reflector to the cone angle of said condensing means to provide maximum radiant transfer of said generated light;

beam splitter means in optical alignment with said condensed light and the viewing angle of a camera, such that said projected light and said camera are nodally coincident;

whereby light having desired wavelengths is projected.

2. The projector as defined by claim 1, wherein said series of dichroic filters includes:

a first transmission filter disposed in optical alignment with said mercury-xenon arc lamp;

a second reflection filter disposed in alignment with said first filter for narrowing the bandwidth of said projected light;

a third transmission filter disposed generally orthogonal to said light reflected off of said second filter for further narrowing the bandwidth of said light;

a fourth reflection filter disposed between said third filter and said condensing means and located at generally a 45 angle to said projected light beam, for further limiting the bandwidth of said projected light.

3. The projector as defined by claim 1, wherein said dichroic filters pass substantially only blue light having a 436 n.m. wavelength.

4. The projector as defined by claim 1, wherein said dichroic filters pass substantially only green light having a 545 n.m. wavelength.

5. The projector as defined by claim 1, wherein said dichroic filters pass substantially only red light having a 650 n.m. wavelength.

6. The projector as defined by claim 1, wherein said dichroic filters pass substantially only yellow light having a 589 n.m. wavelength.

7. The projector as defined by claim 2, wherein said integrator means matches the irradiance cone angle of said discharge lamp reflector to the cone angle of said condensing means to provide maximum radiant transfer of said generated light.

8. The projector as defined by claim 7, said beamsplitter means includes a beamsplitter having at least one surface which is coated with a dichroic material for passing light only in a desired range of wavelengths.

9. The projector as defined by claim 8, further including a light trap located opposite said surface of said beam splitter for absorbing unwanted light from said projector through said beam splitter.

10. The projector as defined by claim 9, wherein said light trap includes:

a light absorbing glass pane in optical alignment with said unwanted light passing through said beam splitter;

a first light absorbing material disposed below said glass pane;

a second light absorbing material disposed at a predetermined angle to said glass pane such that light reflected off of said glass pane is reflected onto said second light absorbing material.

11. The projector as defined by claim 10, wherein said mercury-xenon arc lamp is 5000 watts.

* * * * *